United States Patent [19]
Leon

[11] Patent Number: 5,086,273
[45] Date of Patent: Feb. 4, 1992

[54] A.C. ELECTROMAGNETIC SYSTEM FOR DETERMINING POSITION OF AN ENCASED MOVABLE ELECTRICALLY CONDUCTIVE ELEMENT

[75] Inventor: Robert L. Leon, Maple Glen, Pa.

[73] Assignee: Liberty Technology Center, Inc., Conshohocken, Pa.

[21] Appl. No.: 511,657

[22] Filed: Apr. 20, 1990

[51] Int. Cl.$^5$ .................... G01B 7/14; F16K 37/00
[52] U.S. Cl. ........................ 324/207.17; 116/277; 137/554; 324/226
[58] Field of Search ............... 324/207.14, 207.15, 324/207.16, 207.20, 207.21, 207.22, 207.23, 234–236, 226, 227, 259–262; 116/277; 222/424.5; 137/554

[56] References Cited

U.S. PATENT DOCUMENTS

| | | |
|---|---|---|
| 3,017,621 | 1/1962 | Taborsky . |
| 3,602,254 | 8/1971 | Fawkes ................. 137/554 |
| 3,859,619 | 1/1975 | Ishihara et al. ......... 137/554 X |
| 3,914,994 | 10/1975 | Banner .................. 137/554 X |
| 4,429,578 | 2/1984 | Darrel et al. .............. 73/659 |
| 4,498,495 | 2/1985 | Worwood et al. ......... 137/557 |
| 4,507,976 | 4/1985 | Banko ................. 73/861.54 |
| 4,523,286 | 6/1985 | Koga et al. ............. 364/494 |
| 4,535,629 | 8/1985 | Prine ....................... 73/587 |
| 4,573,114 | 2/1986 | Ferguson et al. .......... 364/138 |
| 4,618,824 | 10/1986 | Magee et al. .......... 137/554 X |
| 4,636,780 | 1/1987 | Thomas et al. ........... 340/680 |
| 4,711,266 | 12/1987 | Leiber ................... 137/554 |
| 4,737,774 | 4/1988 | Chapman et al. .......... 340/573 |
| 4,777,979 | 10/1988 | Twerdochlib .......... 324/207.26 X |
| 4,833,453 | 5/1989 | Twevdochlib ......... 137/554 X |
| 4,849,655 | 7/1989 | Bennett .................. 307/309 |
| 4,914,388 | 4/1990 | Kalista et al. .......... 137/554 X |
| 4,977,778 | 12/1990 | Nafziger et al. ........... 73/597 |

FOREIGN PATENT DOCUMENTS

| | | |
|---|---|---|
| 0124377 | 1/1984 | Japan . |
| 0067677 | 10/1986 | Japan . |
| WO8803241 | 5/1988 | PCT Int'l Appl. . |

OTHER PUBLICATIONS

Document entitled, "Application Guidelines for Check Valves in Nuclear Power Plants", *Electric Power Research Institute* Project 2233-20, Final Report, Jan., 1988; cover & pp. 4-1 to 4-10 and 5-1 and 5-18.

Document entitled, "Significant Operating Experience Report", *Institute of Nuclear Power Operations*, Atlanta, Ga., Oct. 1986 (13 pages).

Document entitled, "Performance Monitoring of Swing Check Valves Using Magnetic Flux Signature Analysis", *Information Package Containing Selected MFSA Test Results,* Haynes, H. D., Eissenberg, D. M., May, 1989 (10 pages).

*Primary Examiner*—Kenneth A. Wieder
*Assistant Examiner*—W. S. Edmonds
*Attorney, Agent, or Firm*—Panitch Schwarze Jacobs & Nadel

[57] ABSTRACT

A system to determine the position of an electrically conductive element movably positioned in a housing, like a metal disc in a check valve, includes an A.C. electromagnet positioned in close proximity to the valve casing and the disc. The magnet is excited with an A.C. voltage to generate a magnetic field which penetrates the casing and the disc. The magnetic field is detected by a sensor. A.C. current and voltage signals from the electromagnet and a magnetic field signal from the sensor are presented to a processor portion of the system. The processor portion digitizes, amplitude and phase modulates each of the three signals and generates four traces: A.C. current amplitude, magnetic field amplitude, A.C. current phase and magnetic field phase. The latter two traces are derived with respect to an A.C. voltage phase signal. Comparable baseline signals previously gathered for the valve are stored. One to four of the traces are displayed, with or without the corresponding baseline trace, for determination of disc position.

23 Claims, 2 Drawing Sheets

A.C. ELECTROMAGNETIC SYSTEM FOR DETERMINING POSITION OF AN ENCASED MOVABLE ELECTRICALLY CONDUCTIVE ELEMENT

BACKGROUND OF THE INVENTION

The present invention relates generally to the detection of the position of a metal part or other element of electrically conductive material movable in a device or apparatus and, more particularly, to a means for determining the position of the disc of a check valve while the valve is in operation.

Check valves are widely employed in nuclear power plants, refineries and other chemical processing plants, pipelines and elsewhere to control fluid flow. The purpose of a check valve is to allow fluid flow in one direction and prevent flow in the reverse direction. The force of the fluid passing through the valve pushes the disc open in the forward flow direction, but if the fluid starts to reverse its direction of flow, because an upstream pump has been shut off or for whatever reason, the disc closes to stop the reverse flow, usually assisted by gravity and sometimes by springs. When the disc closes, it moves down to seal against the valve seat which is located on the upstream side of the valve, thus shutting off the flow. When flow reestablishes in the forward direction, the disc swings up out of the way to allow the flow to take place unimpeded. A backstop usually exists in the valve to restrain the travel of the disc in the opening direction, thereby establishing the disc's full open position.

It is important to know the position of the disc within the valve to verify full closure or full opening or to assess the degree of partial opening or to see the existence and magnitude of a disc fluttering condition or a backstop tapping condition, the latter two being detrimental to the long term life of the valve, as they cause damage or wear to internal hinge pins, disc studs and other valve internal parts. Because it is not possible to see the disc, it is necessary to ascertain its position and behavior by alternative means from the outside of the valve. Though it is possible to attach linkages or even magnets to the valve internals and monitor their motion from the outside of the valve, such devices require special attachment means, and, in the case of linkages, special sealing means, and this makes their use somewhat undesirable.

The present invention addresses the problem of externally monitoring the operation of such a valve or other enclosed, movable, electrically conductive element, while avoiding the use of special internal attachments or sealing means or any disassembly of the valve or device enclosing such element.

SUMMARY OF THE INVENTION

Briefly, the present invention is a system for detecting from outside a housing the position of an electrically conductive element movably enclosed in the housing. The system comprises an A.C. electromagnet means connected to an A.C. voltage source. The electromagnet is positioned proximal the housing for generating a magnetic field penetrating the housing and the element. The system further comprises sensor means for sensing the instantaneous A.C. current flowing in the electromagnet and amplitude demodulation means for amplitude demodulating the sensed A.C. current and generating a trace of sensed A.C. current amplitude. The instantaneous value of the sensed A.C. current amplitude is related to the instantaneous position of the element in the housing.

BRIEF DESCRIPTION OF THE DRAWINGS

The foregoing summary, as well as the following detailed description of a preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings.

DESCRIPTION OF PREFERRED EMBODIMENTS

Figure 1:
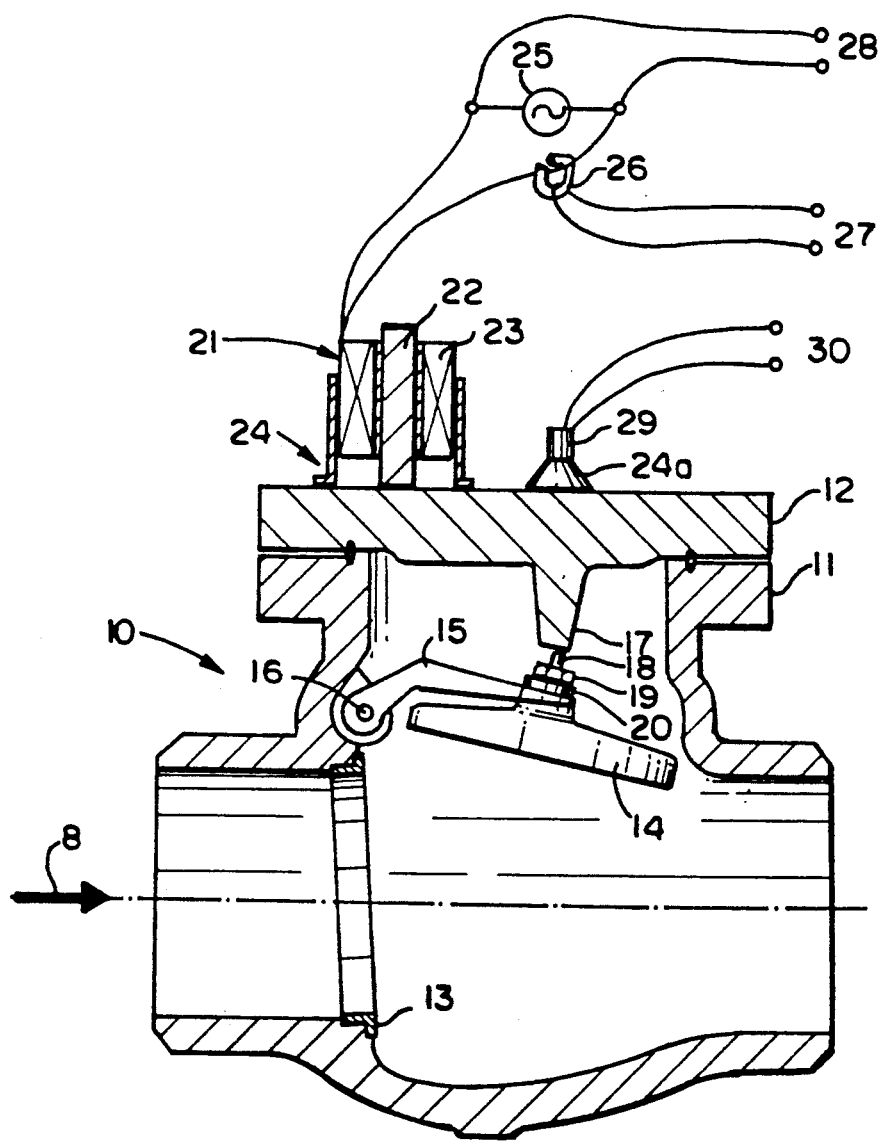
FIG. 1 is a diagrammatic, sectioned elevation view of a check valve with preferred components of a preferred system in accordance with the present invention.

Referring now in greater detail to the drawings, in which like numerals indicate like elements throughout, there is shown in FIG. 1, an elevation view of a swing-type check valve, indicated generally at 10 and shown in section. Forward fluid flow permitted by the valve 10 is indicated by arrow 8. This type of check valve is the most common type of check valve in use today in power plants, refineries and other large scale chemical processing plants, pipelines, etc. Such valves are commercially available from a variety of sources. The valve 10 includes a housing or casing in the form of a valve body 11, and a bonnet 12, typically removably coupled to the body 11 with bolts (not depicted). A seat 13 is provided to receive a disc 14 supported on an arm 15 pivotally coupled by a hinge pin 16 to the body 11 proximal the seat 13. A backstop 17, is formed by a central boss on the inner side of the bonnet 12. A stud 18 extends from the disc 14 through an end of an arm 15 remote from hinge pin 16. The disc 14 is secured to the arm 15 by a nut 19 and washer 20 received on the stud 18. At least one of the disc 14 and arm 15 must be made of an electrically conductive material in order for the system to work. Typically both are made of metal.

FIG. 1 further depicts diagrammatically some of the components of the system of the present invention which are generally associated with the valve 10. These include an A.C. electromagnet 21 having a core 22 and a surrounding coil 23. A temporary attachment means is indicated generally at 24 and is provided for positioning the electromagnet 21 proximal the casing 11 and the disc 14. Preferably, the attachment means 24 permits easy, repeated attachment of the electromagnet 21 to the valve 10 in the same location for taking measurements at different times. The core intensifies and focuses magnetic lines of force generated by the magnet 21 within the valve 10 particularly directly beneath the magnet in the vicinity of the seat, disc and arm 14–16. The coil 23 of A.C. electromagnet 21 is coupled with an A.C. voltage source indicated diagrammatically at 25. When the coil 23 is excited by the A.C. source 25, the magnet 21 generates a magnetic field penetrating the housing formed by body 11 and bonnet 12, and the disc 14 and arm 15 within the housing. An instantaneous A.C. current flowing through the electromagnet 21, in particular, the coil 23, is preferably sensed by a first sensor means 26, such as a toroidal or clamp-on ammeter, the output of which is available for processing and/or recording at terminals 27. Second means are preferably provided for sensing instantaneous A.C. voltage across the electromagnet 21. Instantaneous A.C. voltage across the electromagnet 21 can be picked up directly from the A.C. source 25, as shown, and made available for recording at terminals 28. Alternatively, the voltage may be sensed indirectly by another sensor such as potential transformer (not depicted), the output of which can be made available at terminals 28. Preferably, a magnetic field sensor 29, such as Hall effect sensor, is provided, preferably mounted to the bonnet 12 through a high permeability focusing cone 24a, to sense the instantaneous magnetic field generated by the electromagnet 21 which is oriented normal to the exterior surface of the valve body 11 and bonnet 12 at this or any other mounting location, as shown. Its output is made available for recording at terminals 30.

The A.C. current that flows in the coil 23 of electromagnet 21 creates an A.C. magnetic field that emanates from one end of the core 22 and returns through the other end. In between, many of the magnetic lines travel through the valve 10, its casing and its inner structure, including the hinge arm 15 and disc 14.

The use of an A.C. rather than a D.C. electromagnet provides more than just the addition of phase variation information subsequently discussed. It makes possible the use of the invention on valves, or other devices with movable conductive parts not made of ferromagnetic metal. The A.C. magnetic field will be affected by the position of the disc and/or the hinge arm just as long as one is or both are electrically conductive. The frequency of the A.C. current should be low, probably 60 Hz or less, so as to maximize the penetrating ability of the magnetic field.

As a result of the penetration of the magnetic field in the disc 14 and/or arm 15, the self-inductance L of the coil 23 varies slightly with the position of the electrically conductive one or both of the disc 14 and arm 15. This means that the amplitude and phase of the A.C. current flowing through the coil 23 also vary slightly with variation in the position of the hinge arm 15 and/or disc 14. Thus, detecting variations in the instantaneous amplitude or the instantaneous phase (with respect to the voltage) of the A.C. current through electromagnet 21 yields signals related to the instantaneous position of the arm 15 and/or disc 14 within the valve 10.

Since the position of the disc 14 and/or arm 15 affects the overall A.C. magnetic field, it also affects the A.C. magnetic field at the location of the magnetic sensor 29. Thus detecting variations of the instantaneous amplitude or the instantaneous phase (with respect to the voltage) of the output of the magnetic field sensor 29 also yields signals related to the instantaneous position of the disc 14 and/or arm 15 within the valve 10.

Figure 2:
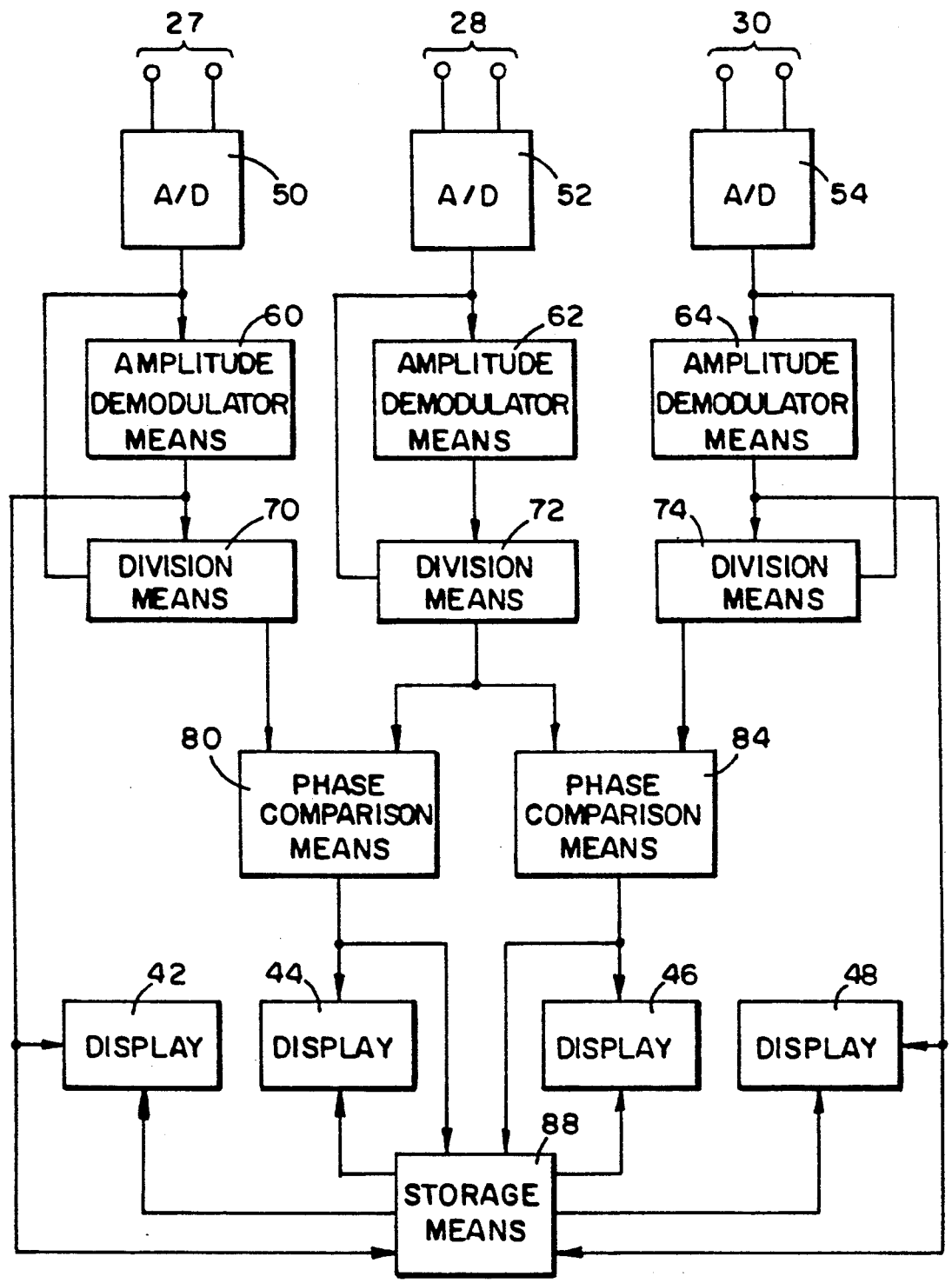
FIG. 2 is a functional block diagram showing the remaining components and operation of a preferred system.

FIG. 2 depicts, in block diagram form, the remaining components of the preferred system of the present invention. The components will now be described in connection with a description of the use of the system to gather baseline data. The sensory components of the system are installed as indicated in FIG. 1 and the valve 10 operated, for example, by generating a fluid flow to move the disc 14 from a first position on the valve seat 13 where the valve 10 is closed to a second position with stud 18 contacting stop 17 on the bonnet where the valve is fully open. Any of a variety of conventional sensors can be used to determine and/or verify the fully opened and fully closed positions of the valve 10 and to note the occurrence of those conditions while the baseline data is being gathered. Three signals are presented to the components of the system in FIG. 2: the instantaneous A.C. current signal at terminals 27; the instantaneous A.C. voltage signal at terminals 28; and the instantaneous magnetic field signal at terminals 30. All, after any required analog conditioning such as amplification or filtering, are digitized by the system using separate, ordinary, commercially available, analog-to-digital converters 50, 52, 54, preferably simultaneously so that the gathered data can be phase correlated to one another and to the position of the disc/arm. Preferably, the digitized signals are then amplitude demodulated by amplitude demodulation means 60, 62, 64, respectively, for obtaining separate traces of sensed A.C. current, A.C. voltage, and magnetic field amplitude envelopes from each of the three original signals. This results directly in the generation of two of the four baseline traces: the A.C. current envelope (amplitude) trace and the magnetic field envelope (amplitude) trace. Alternatively, these traces could have been obtained by analog demodulation and filtering prior to digitizing, but this typically limits the frequency response to one-half the A.C. frequency. In the preferred embodiment using digital demodulation, it is possible to retain frequencies beyond the A.C. frequency. As used herein, trace refers to any waveform or the data represented by such waveform.

In the next step, each data point of the digitized A.C. current amplitude trace from the amplitude demodulator means 60 is divided into the algebraic value of the corresponding digitized sample point from the A/D converter 50 by division means 70 to generate a trace of the digitized F.M. current waveform from the sensed instantaneous A.C. current signal. In like fashion, as is diagrammed in FIG. 2, a digitized instantaneous F.M. voltage waveform trace and a digitized instantaneous F.M. magnetic field waveform trace are also obtained through converters 52, 54, amplitude demodulator means 62, 64, and division means 72, 74, respectively, from the sensed A.C. voltage and magnetic field signals. These waveforms have the characteristic of having unity amplitude and only frequency or phase variations. Because of their unity amplitude characteristic, these waveforms can be compared on a point-by-point basis to determine their phase differences point by point. The digitized instantaneous F.M. current waveform from division means 70 is compared in this fashion with the digitized instantaneous F.M. voltage waveform from division means 72 in phase comparison means 80 for phase demodulating the sensed instantaneous A.C. current with respect to the sensed instantaneous A.C. voltage and for generating a digital trace of the sensed A.C. current phase waveform. In like fashion, the phase comparison means 84 phase demodulates the digitized, instantaneous F.M. magnetic field waveform from division means 74 with respect to the digitized instantaneous F.M. voltage waveform from division means 72 and generates a digitized trace of the magnetic field phase waveform. The phase waveform traces from phase comparison means 80 and 84 are the last two baseline traces. They show how the phasing of the A.C. current and A.C. magnetic field signals relates to disc/arm positioning. The previously obtained A.C. current and magnetic field amplitude traces show how the amplitude of the A.C. current and magnetic field signals, respectively, relate to disc/arm positioning.

At the very least, the A.C. current amplitude and the magnetic field amplitude traces from amplitude demodulation means 60 and 64 and the phase traces from phase comparison means 80 and 84 are stored in storage means 88 for future determination of the position of the disc/arm combination. If desired, the analog signals at 27, 28 and 30 and/or the digital signals from A/D converters 50, 52 and 54 can be recorded for delayed processing.

Each of the four traces from components 60, 64, 80 and 84 (and any of the other signals being gathered) can be displayed. Four trace displays 42, 44, 46 and 48 are indicated to show that any and all of the four preferred traces can be displayed at one time. Preferably, each of the baseline traces is displayed shortly after generation so that proper gathering of a usable trace is verified.

Preferably, amplitude demodulation means 60, 62, 64, division means 70, 72 and 74 and phase comparison means 80 and 84 are all provided by a suitably programmed personal computer (not depicted). Alternatively, dedicated circuits and/or processors could be used. Storage means 88 may be any conventional digital data storage means which is capable of capturing and retaining at least the digitized data outputted from means 60, 64, 80 and 84. Preferably, storage means 88 is a single device associated with the personal computer. However, storage means 88 can be provided by one or more dedicated storage devices.

FIG. 2 also conceptually shows how the three signals made available at terminals 27, 28 and 30 preferably are manipulated in various combinations to subsequently extract information about the instantaneous position of the disc 14. After repositioning the cone 24a, magnet 21 and sensor 29 in their original positions with respect to the valve 10, the magnet 21 is excited with the A.C. source 25 and signals presented at contacts 27, 28 and 30. Traces are again generated from the signals presented at contacts 27, 28 and 30 using the various means 50, 52, 54, 60, 62, 64, 70, 72, 74, 80 and 84 in exactly the same manner that the baseline traces were generated. Preferably, the four preferred traces are again recorded in the storage means 88 for display and analysis. Up to four separate displays may be presented: 42, 44, 46, and 48. Each display 42, 44, 46, and 48 preferably presents a separate trace representing, in different fashion, the instantaneous position of the disc (or arm or arm/disc combination). Any one of the displays 42, 44, 46, and 48 can be used to indicate instantaneous position, but one type of display may be clearer for one valve or one portion of disc/arm travel, while a different trace might be clearer for another. Thus, there is an advantage to more than one display. The present invention covers all possible combinations of the one to four displays 42, 44, 46, and 48. Of course, while four separate and simultaneous displays 42, 44, 46, and 48 are indicated, one of ordinary skill will appreciate that the displays 42, 44, 46 and 48 can be depicted simultaneously on separate display devices, simultaneously in different regions of a single display device or sequentially on a single display device.

Baseline traces in storage means 88 are retrievable and can be displayed with the more recently obtained traces. Baseline traces at the very least provide values corresponding to the disc at the fully closed and fully open positions. These values can be compared to the instantaneous values of the more recently obtained traces to determine the position(s) of the disc when the more recently obtained instantaneous values were obtained. This can be done in a variety of ways including simultaneous or sequential displays of baseline traces and more recently gathered instantaneous traces. Moreover, the baseline trace(s) can be reduced to a table or scale on the display, even one having only maximum and minimum values. Undoubtedly, more complicated displays can be created including, for example, a moving CAD/CAM representation of the valve.

While the functional block diagram of the basic circuitry of the presently preferred embodiment of the invention is illustrated in FIGS. 1 and 2 and described above, it will be appreciated that the invention may be implemented utilizing different circuitry. It will also be appreciated that the particular manner in which the block diagram of FIG. 2 is specifically implemented is well within the skill of an ordinary designer and that particular circuits, components, etc., will vary, depending upon the specific design approach employed. In particular, the processing circuitry including elements 50, 52, 54, 60, 62, 64, 70, 72, 74, 80, and 84 can be provided by hardware, firmware, software, and combinations of the above.

From the foregoing description, it can be seen that the present invention comprises a system for externally determining the position of the disc in a check valve or other electrically conductive element movably enclosed in a housing. The system is adaptable not only to swing-type check valves as described herein, but also to other types of check valves having a position-changeable metal disc, and generally to other housing or casing enclosed devices where the overall position of some large electrically conductive internal part needs to be known.

It will be appreciated by those skilled in the art that the applications and changes of the type discussed above, as well as other applications and changes, could be made to the described embodiment without departing from the broad inventive concepts thereof. It is understood, therefore, that this invention is not limited to the particular embodiment discussed, but it is intended to cover all modifications which are within the scope and spirit of the invention as defined by the appended claims.

I claim:

1. A system for detecting from outside a housing the position of an electrically conductive element movably enclosed in the housing, the system comprising:

A.C. electromagnet means connected to an A.C. voltage source and positioned proximal to the housing for generating a magnetic field penetrating the housing and the element, the A.C. electromagnet means including a coil and a core means at least partially within the coil for intensifying and focusing magnetic lines of force generated by the A.C. electromagnet means so as to penetrate the housing and the electrically conductive element from outside the housing;

sensor means for sensing the instantaneous A.C. current flowing through the electromagnet means; and amplitude demodulation means for amplitude demodulating the sensed A.C. current and generating a trace of sensed A.C. current amplitude, an instantaneous value of the sensed A.C. current amplitude trace being related to an instantaneous position of the element in the housing.

2. The system as recited in claim 1, further comprising storage means storing a baseline A.C. current amplitude trace, the baseline trace being previously obtained for known positions of the element in the housing, for relating instantaneous values of the sensed A.C. current amplitude with the position of the element in the housing.

3. The system as recited in claim 1 further comprising:
   means for sensing instantaneous A.C. voltage across the A.C. electromagnet coil; and
   phase comparison means for phase demodulating the sensed A.C. current with respect to the sensed A.C. voltage and for generating a trace of sensed A.C. current phase, the instantaneous value of the sensed A.C. current phase trace being related to the instantaneous position of the element in the housing.

4. The system as recited in claim 3 further comprising storage means storing a baseline A.C. current phase trace, the baseline trace being previously obtained for known positions of the element in the housing for relating instantaneous values of the sensed A.C. current phase with position of the element in the housing.

5. The system as recited in claim 1, further comprising:
   magnetic field sensor means located proximal the housing for sensing the magnetic field generated by the A.C. electromagnet and varied by the movable element; and
   amplitude demodulation means for amplitude demodulating the sensed magnetic field and for generating a trace of sensed magnetic field amplitude, the instantaneous value of the sensed magnetic field amplitude being related to the instantaneous position of the element in the housing.

6. The system as recited in claim 5 further comprising storage means storing a baseline sensed magnetic field amplitude trace, the baseline trace being previously obtained for known positions of the element in the housing for relating instantaneous values of the sensed magnetic field amplitude with position of the element in the housing.

7. The system as recited in claim 3 further comprising:
   magnetic field sensor means located proximal the housing for sensing the magnetic field generated by the A.C. electromagnet and varied by the movable element; and
   amplitude demodulation means for amplitude demodulating the sensed magnetic field and for generating a trace of the sensed magnetic field amplitude, the instantaneous value of the magnetic field amplitude being related to the instantaneous position of the element in the housing.

8. The system as recited in claim 7 further comprising storage means storing a baseline sensed magnetic field amplitude trace, the baseline trace being previously obtained for known positions of the element in the housing for relating instantaneous values of the sensed magnetic field amplitude with position of the element in the housing.

9. The system as recited in claim 7, further comprising:
   phase comparison means for phase demodulating the sensed magnetic field with respect to the sensed instantaneous A.C. voltage and for generating a trace of the sensed instantaneous magnetic field phase, the instantaneous value of the magnetic field phase trace being related to the instantaneous position of the movable element in the housing.

10. The system as recited in claim 9 further comprising storage means storing a baseline sensed magnetic field phase trace, the baseline trace being previously obtained for known positions of the element in the housing for relating instantaneous values of the sensed magnetic field phase with position of the element in the housing.

11. The system as recited in claim 1 wherein the housing is a check valve casing and the movable element is at least one of a disc and an arm supporting the disc in the casing.

12. The system as recited in claim 2 wherein the housing is a check valve casing and the movable element is at least one of a disc and an arm supporting the disc in the casing.

13. The system as recited in claim 3 wherein the housing is a check valve casing and the movable element is at least one of a disc and an arm supporting the disc in the casing.

14. The system as recited in claim 4 wherein the housing is a check valve casing and the movable element is at least one of a disc and an arm supporting the disc in the casing.

15. The system as recited in claim 5 wherein the housing is a check valve casing and the movable element is at least one of a disc and an arm supporting the disc in the casing.

16. The system as recited in claim 6 wherein the housing is a check valve casing and the movable element is at least one of a disc and an arm supporting the disc in the casing.

17. The system as recited in claim 7 wherein the housing is a check valve casing and the movable element is at least one of a disc and an arm supporting the disc in the casing.

18. The system as recited in claim 8 wherein the housing is a check valve casing and the movable element is at least one of a disc and an arm supporting the disc in the casing.

19. The system as recited in claim 9 wherein the housing is a check valve casing and the movable element is at least one of a disc and an arm supporting the disc in the casing.

20. The system as recited in claim 10 wherein the housing is a check valve casing and the movable element is at least one of a disc and an arm supporting the disc in the casing.

21. A system for detecting from outside a housing the position of an electrically conductive element movably enclosed in the housing, the system comprising:
   A.C. electromagnet means connected to an A.C. voltage source and positioned proximal to the housing for generating a magnetic field penetrating the housing and the element, the A.C. electromagnet means including a coil and a core means at least partially within the coil for intensifying and focusing magnetic lines of force generated by the A.C. electromagnet means so as to penetrate the housing and the electrically conductive element from outside the housing; and
   magnetic field sensor means located proximal to the housing for sensing the magnetic field generated by the A.C. electromagnet and varied by the movable element.

22. The system of claim 21 further comprising amplitude demodulation means for amplitude demodulating the sensed magnetic field and for generating a trace of sensed magnetic field amplitude, the instantaneous value of the sensed magnetic field amplitude being related to the instantaneous position of the element in the housing.

23. The system as recited in claim 22 further comprising storage means storing a baseline sensed magnetic field amplitude trace, the baseline trace being previously obtained for known positions of the element in the housing, for relating instantaneous values of the sensed magnetic field amplitude with position of the element in the housing.

* * * * *

REEXAMINATION CERTIFICATE (2241st)
United States Patent [19]
Leon

[11] B1 5,086,273
[45] Certificate Issued Mar. 8, 1994

[54] A.C. ELECTROMAGNETIC SYSTEM FOR DETERMINING POSITION OF AN ENCASES MOVABLE ELECTRICALLY CONDUCTIVE ELEMENT

[75] Inventor: Robert L. Leon, Maple Glen, Pa.

[73] Assignee: Liberty Technology Center, Inc., Conshohocken, Pa.

Reexamination Request:
No. 90/002,808, Aug. 7, 1992

Reexamination Certificate for:
Patent No.: 5,086,273
Issued: Feb. 4, 1992
Appl. No.: 511,657
Filed: Apr. 20, 1990

[51] Int. Cl.⁵ .......................... G01B 7/14; F16K 37/00
[52] U.S. Cl. .............................. 324/207.17; 116/277; 137/554; 324/226
[58] Field of Search ............... 324/207.14, 207.15, 324/207.16, 207.20, 207.21–207.23, 207.17, 234–236, 226, 227, 259–262; 116/277; 137/554; 222/424.5

[56] References Cited

U.S. PATENT DOCUMENTS

| | | | |
|---|---|---|---|
| 3,017,621 | 1/1962 | Taborsky | 324/207.17 X |
| 3,602,254 | 8/1971 | Fawkes | 137/554 |
| 3,859,619 | 1/1975 | Ishihara et al. | |
| 3,914,994 | 10/1975 | Banner | 73/118 |
| 4,429,578 | 2/1984 | Darrel et al. | 73/659 |
| 4,498,495 | 2/1985 | Worwood et al. | 137/557 |
| 4,507,976 | 4/1985 | Banko | 73/861.54 |
| 4,523,286 | 6/1985 | Koga et al. | 364/494 |
| 4,535,629 | 8/1985 | Prine | 73/587 |
| 4,573,114 | 2/1986 | Ferguson et al. | 364/138 |
| 4,618,824 | 10/1986 | Magee et al. | |
| 4,636,780 | 1/1987 | Thomas et al. | 340/680 |
| 4,711,266 | 12/1987 | Leiber | 137/554 |
| 4,737,774 | 4/1988 | Chapman et al. | 340/573 |
| 4,777,979 | 10/1988 | Twerdochlib | |
| 4,833,453 | 5/1989 | Twerdochlib | 340/540 |
| 4,849,655 | 7/1989 | Bennett | 307/309 |
| 4,914,388 | 4/1990 | Kalista et al. | 324/207.16 |
| 4,968,934 | 11/1990 | Robinet et al. | 324/207.22 |
| 4,977,778 | 12/1990 | Nafziger et al. | |
| 5,008,841 | 4/1991 | McElroy | |

FOREIGN PATENT DOCUMENTS

| | | | |
|---|---|---|---|
| 59-017079 | 1/1984 | Japan | |
| 61-228181 | 10/1986 | Japan | |
| WO88/03241 | 5/1988 | PCT Int'l Appl. | 137/554 |

OTHER PUBLICATIONS

"Significant Operating Experience Report", *Institute of Nuclear Power Operations*, Atlanta, Ga., Oct. 15, 1986, pp. 1–13.

Haynes et al., "Performance Monitoring of Swing Check Valves Using Magnetic Flux Signature Analysis", *Oak Ridge National Laboratory*, May 1989, pp. 1–10.

"Application Guidelines for CheckValves in Nuclear Power Plants", *EPRI*, Jan. 1988, pp. cover, 4–1 to 4–10 and 5–1 to 5–18.

J. A. Shercliff, The Theory of Electromagnetic Flow–Measurement, Cambridge University Press, (no month) 1962, pp. 86–107.

*Primary Examiner*—Gerard R. Strecker

[57] ABSTRACT

A system to determine the position of an electrically conductive element movably positioned in a housing, like a metal disc in a check valve, includes an A.C. electromagnet positioned in close proximity to the valve casing and the disc. The magnet is excited with an A.C. voltage to generate a magnetic field which penetrates the casing and the disc. The magnetic field is detected by a sensor. A.C. current and voltage signals from the electromagnet and a magnetic field signal from the sensor are presented to a processor portion of the system. The processor portion digitizes, amplitude and phase modulates each of the three signals and generates four traces: A.C. current amplitude, magnetic field amplitude, A.C. current phase and magnetic field phase. The latter two traces are derived with respect to an A.C. voltage phase signal. Comparable baseline signals previously gathered for the valve are stored. One to four of the traces are displayed, with or without the corresponding baseline trace, for determination of disc position.

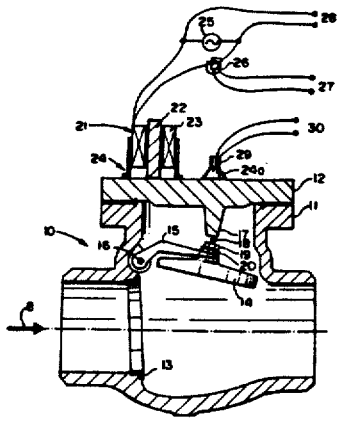

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–20 is confirmed.

Claim 21 is determined to be patentable as amended.

Claims 22 and 23, dependent on an amended claim, are determined to be patentable.

New claims 24–27 are added and determined to be patentable.

21. A system for detecting from outside a housing the position of an electrically conductive element movably enclosed in the housing, the system comprising:
   A.C. electromagnet means connected to an A.C. voltage source and positioned proximal to the housing for generating a magnetic field penetrating the housing and the element, the A.C. electromagnet means including a coil and a core means at least partially within the coil for intensifying and focusing magnetic lines of force generated by the A.C. electromagnet means so as to penetrate the housing and the electrically conductive element from outside the housing; and
   magnetic field sensor means located proximal to the housing for sensing the magnetic field generated by the A.C. electromagnet *means* and varied by the movable element.

24. *A system for non-invasive detection from outside a housing, of instantaneous position of an electrically conductive element movably enclosed in the housing without affecting the position of the element and without physical invasion of the housing, the system comprising:*
   *A.C. electromagnet means connected to an A.C. voltage source, the A.C. electromagnet means being positioned fully outside the housing proximal to the housing for generating outside the housing an A.C. magnetic field penetrating the housing and the element,* *the A.C. electromagnet means including a coil and a core means at least partially within the coil for intensifying and focusing magnetic field generated by the A.C. electromagnet means sufficiently to penetrate the housing and the electrically conductive element from outside the housing without affecting position of the electrically conductive element within the housing being detected by the system; and*
   *magnetic field sensor means for sensing the magnetic field generated by the A.C. electromagnet means and varied by the movable element, the magnetic field sensor means being located fully outside the housing and spaced relative to the A.C. electromagnet means so as to sense changes in the magnetic field caused by changes in position of the electrically conductive element.*

25. *The system of claim 24 in combination with the electrically conductive element and housing wherein the electrically conductive element and housing are selected from the group consisting of: a non-magnetic electrically conductive material element and a non-magnetic material housing, a non-magnetic electrically conductive material element and a magnetic material housing, and a magnetic material electrically conductive element and a magnetic material housing.*

26. *The system of claim 24 further comprises an electric signal demodulator electrically coupled with the magnetic field sensor means.*

27. *A system for non-invasive detection from outside a housing, of instantaneous position of an electrically conductive element movably enclosed in the housing without affecting position of the element and without physical invasion of the housing, the system comprising:*
   *an A.C. electromagnet including at least one coil and one core located at least partially within the one coil, the coil being coupled with an A.C. power source means, the A.C. electromagnet being located fully outside the housing and proximal to the housing, the A.C. electric power source means generating outside the housing through the at least one coil and the at least one core an A.C. magnetic field penetrating the housing and the element; from the A.C. electromagnet located outside the housing;*
   *a magnetic field sensor located fully outside the housing and positioned with respect to the A.C. electromagnet, the housing and the electrically conductive movable element so as to be exposed to changes in the A.C. magnetic field caused by movement of the movable element; and*
   *an electric signal demodulator electrically coupled with the magnetic field sensor.*

* * * * *